United States Patent Office 3,557,077
Patented Jan. 19, 1971

3,557,077
REACTIONS SYSTEM
Kay Brunfeldt, Granparke 135, Lyngby, Denmark; Peter Roepstorff, Holmevej 27A, Virum, Denmark; and John Halstrom, Ejnarsvej 34, Lyngby, Denmark
Filed Sept. 18, 1967, Ser. No. 668,374
Int. Cl. C07c 103/52
U.S. Cl. 260—112.5          15 Claims

ABSTRACT OF THE DISCLOSURE

A closed reaction system, particularly adapted to the solid-phase synthesis of peptides, wherein the reagents and reactants are transferred from storage vessels to a metering vessel, or a reaction vessel, without contacting pumps or valves. The storage vessels are selectively connected to a pressure source to apply a pressure head to the reagent or reactant therein which is at greater pressure than the pressure head prevailing in the metering vessel or reaction vessel, causing the reagent or reactant to flow from the storage vessel to the metering or reaction vessel. The reagent or reactant flow is interrupted by connecting the storage vessel to a pressure source to apply a pressure head to the reagent or reactant therein of less pressure than the pressure head prevailing in the metering or reaction vessel. The flow may be initiated by introducing a non-reactive or inert gas into the storage vessel and the flow interrupted by connecting the storage vessel to a source of vacuum or by introducing a non-reactive or inert gas into the metering or reaction vessel or placing the metering or reaction vessel above the storage vessel and connecting the storage vessel to the atmosphere.

---

Figure 1:
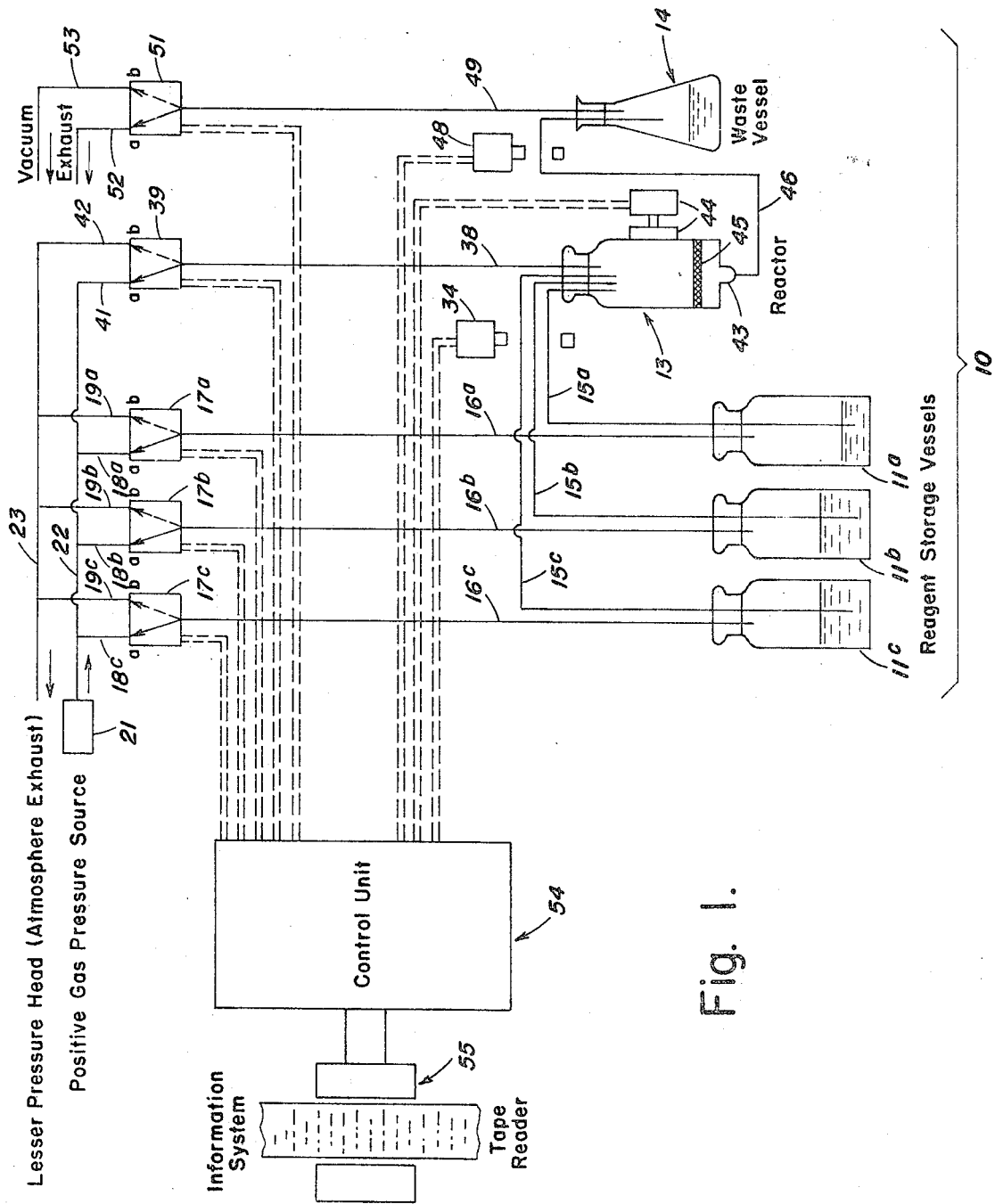

This invention relates to a reaction system and more particularly to a reaction system adapted to perform a plurality of sequential steps. Still more particularly, this invention relates to a reaction system and process particularly suited for the solid-phase synthesis of peptides.

A wide variety of reaction systems for effecting a plurality of sequential operations are known in the art. Thus, for example, Merrifield et al., Analytical Chemistry, volume 38, No. 13, pages 1905–13, have proposed a reaction system particularly adapted to effecting the stepwise synthesis of peptides by the solid-phase method. In brief, the system comprises a plurality of storage vessels for the amino acids and various solvents to be employed in the synthesis. The amino acids and solvent storage vessels are in fluid flow communication with a reaction vessel through a single conduit and a metering pump, with the flow from the amino acid storage vessels to the conduit being controlled by one selector valve and the flow from the solvent storage vessels to the conduit being controlled by another selector valve. The reaction system is controlled by a programmer which sequentially operates the two valves to introduce amino acids and solvents into the reaction vessel in accordance with a predetermined reaction sequence.

In the above-described system, the selector valves must be specially fabricated to prevent cross-contamination of the reagents and even with such precautions, cross-contamination is not entirely eliminated. In addition, due to the nature of the reagents, and the mixing thereof in pumps and valves, corrosion presents a problem. Moreover, there is always a danger of pump or valve failure which decreases the overall effectiveness of the system. Although various equipment has been incorporated into the system in an effort to minimize the above-mentioned difficulties, e.g., rinse lines for the selector valves, the use of such equipment greatly increases the overall cost of the reaction system, and does not entirely eliminate such difficulties.

Accordingly, an object of this invention is to provide a new and improved reaction system which is adapted to effect a plurality of sequential steps.

Another object of this invention is to provide a reaction system, wherein reagents are sequentially transferred from a plurality of storage vessels to a single vessel without contacting valves or pumps.

A further object of this invention is to provide a reaction system and process that is particularly adapted to effecting the solid-phase synthesis of peptides.

Yet another object of this invention is to provide a reaction system which may be automated to effect a plurality of sequential steps.

A still further object of this invention is to provide a reaction system for effecting a plurality of sequential steps which may be produced at low cost.

These and other objects of the invention should be readily apparent from the following detailed description thereof, when read with reference to the accompanying drawings wherein:

The drawings are schematic representations of embodiments of the reaction system of the invention.

The objects of this invention are broadly accomplished by providing a reaction system wherein a reactant or reagent is transferred from one vessel to another by applying a pressure head to the reactant or reagent in the first vessel of greater pressure than the pressure head prevailing in the second vessel and the transfer from the first to second vessel is immediately stopped by applying a pressure head to the reactant or reagent in the first vessel of lesser pressure than the pressure head prevailing in the second vessel.

Figure 2:
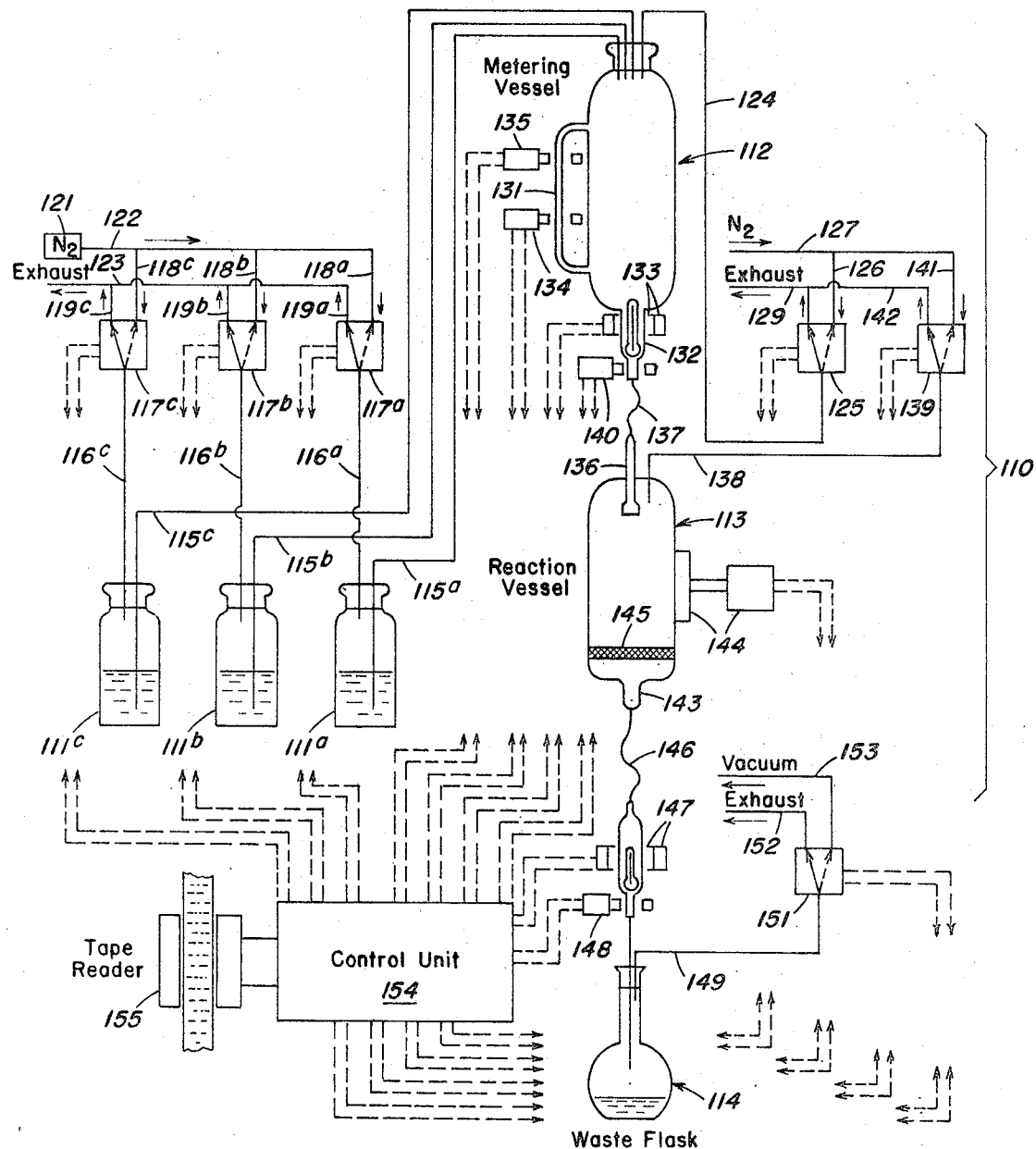

The invention will now be described with reference to a general embodiment thereof as illustrated in FIG. 1 of the accompanying drawings, and to a specific embodiment as illustrated in FIG. 2 of the drawings, but it is to be understood that the scope of the invention is not to be limited thereby.

Referring now to FIG. 1, there is shown a reaction system 10, containing a plurality of closed reactant or reagent storage flasks or vessels 11a, 11b and 11c, a closed reaction flask or vessel 13, and a closed waste flask or vessel 14. The closed storage vessels 11a–11c are each provided with conduits 15a, 15b and 15c, respectively, which extend to the bottom thereof and place the storage vessels 11a–11c in fluid flow communication with the closed reaction vessel 13. Fluid flow through conduits 15a–15c is sensed by a photocell 34 (or other flow sensing and/or measuring apparatus) as hereinafter described. The storage vessels 11a–11c are further provided with conduits 16a, 16b and 16c, respectively, connecting to three-way valves 17a, 17b and 17c, respectively, which place the conduits 16a–16c in fluid flow communication with either conduits 18a, 18b and 18c (position a), respectively, or conduits 19a, 19b and 19c, (position b), respectively. The conduits 18a–18c are in fluid flow communication with a source of positive gas pressure 21 through conduit 22 and conduits 19a–19c are in fluid flow communication through conduit 23 with a pressure which is less than said positive pressure such as for example atmospheric pressure.

The reaction vessel 13 is provided with a conduit 38 connecting to a three-way valve 39 which places the reaction vessel 13 in fluid flow communication with either a source of positive gas pressure through conduits 41 and 22 (position a) or the atmosphere or lower pressure source through conduits 42 and 23 (position b). The closed reaction vessel is also provided with an outlet 43 and a shaking mechanism, schematically indicated as 44, to provide mixing of the reactant(s) and/or reagent(s) in the reaction vessel 13. The reaction vessel 13 may contain, at the lower portion thereof, a sintered disk 45 which functions as both a filter for fluid reactants and a support for solid reactants which may be placed within the reaction vessel prior to the conduct of a desired reaction. The reaction vessel may be provided with appropriate heating or cooling coils or apparatus whereby the temperature conditions therein may be controlled. Such vessel may further be provided with sensing or sampling devices capable of providing information concerning the state of the reactions taking place therein.

The outlet 43 of reaction vessel 13 is connected to waste flask 14 through conduit 46 and is further provided with a photocell 48 (or other flow measuring apparatus) which senses fluid flow therethrough, as hereinafter described. It should be apparent that the conduits 15a–15c, 38 and 46 must be formed of a flexible material so that shaking of the reaction vessel 13 may be effected. The waste flask 14 is provided with an outlet conduit 49, connected to a three-way valve 51, which places conduit 49 in fluid flow communication with either an exhaust conduit 52 (position a) or a vacuum source (not shown) through conduit 53 (position b).

The reaction system 10 is provided with a control unit 54, which can be programmed by an information system 55 such as a tape reader or other device providing sequence commands, to automatically control the reaction system. At the beginning of a cycle all three-way valves are open to the atmosphere. On command from the information system 55 the control unit 54 initiates the cycle by positioning valve 17a in position a to place vessel 11a in fluid flow communication with the source of positive gas pressure 21 through conduits 16a, 18a and 22. The increased pressure in vessel 11a causes fluid to flow therefrom through conduit 15a into reaction vessel 13.

The flow of reactant introduced into reaction vessel 13 may be monitored by the flow metering and sensing device 34 which signals the control unit when flow is initiated, with fluid flow in conduit 15a being continued until the desired volume of reactant or reagent has been transferred to vessel 13. The control unit then terminates the flow of reactant from storage vessel 11a by positioning valve 17a in position b (exhaust) and valve 39 in position a (positive pressure) whereby fluid remaining in conduit 15a is returned to storage vessel 11a under pressure; or by positioning valve 17a in position b (exhaust) with the residual fluid in conduit 15a returning to storage vessel 11a by gravity/siphon effect where the storage vessel 11a is positioned below the reaction vessel 13. Flow sensing device 34 signals the control unit when flow-back of reactant to vessel 11a through conduit 15a has been completed. The flow of reactant from the reaction vessel through outlet 43 is inhibited by flow resistance established in conduit 46 by means of a static head or other known flow constrictive device.

With the measured quantity of reactant in reaction vessel 13, the control unit 54 places valve 39 in position b and actuates the shaker mechanism 44 which oscillates the reaction vessel to effect mixing of the fluid reactant with previously introduced reactant or reagent materials. The control unit 54 operates, based upon programming from the information system, to maintain the shaking for a predetermined period of time or number of strokes and after such time the control unit 54 signals the tape reader 55 to initiate the next step of the programmed cycle, i.e., removal of waste material from the reaction vessel 13.

The control unit simultaneously opens valve 51 to vacuum (position b) whereby expended fluid reactants or reagents within the reaction vessel 13 are sucked through conduit 46 to waste vessel 14. Flow of expended reactant through conduit 46 is monitored by flow sensing device 48 and as soon as fluid ceases to flow from the reaction vessel 13 to the waste vessel 14, in conduit 46, the sensing device 48 signals the control unit 54 which thereafter (or after a predetermined time delay) signals the information system to initiate the next step of the cycle. The control unit then switches valve 51 to position a and commences the transfer cycle for the reactant or reagent in storage vessel 11b. Thus, a complete cycle has been described in terms of the general closed reaction system of FIG. 1.

The reaction system hereinabove described may be varied in numerous ways within the spirit and scope of the invention. Thus, although only three storage vessels have been shown, it should be apparent that more or less vessels may be employed depending upon the particular reaction to be effected.

Referring to FIG. 2 of the drawings, the invention will now be more particularly described with reference to a specific embodiment thereof. In FIG. 2 there is shown a reaction system 110, containing a plurality of closed reactant or reagent storage flasks or vessels 111a, 111b and 111c, a metering flask or vessel 112, a closed reaction flask or vessel 113, and a closed waste flask or vessel 114. The storage vessels 111a–111c are each provided with conduits 115a, 115b and 115c, respectively, which extend to the bottom thereof and place the storage vessels 111a–111c in fluid flow communication with the metering vessel 112. The storage vessels 111a–111c are further provided with conduits 116a, 116b and 116c, respectively, connecting to three-way valves 117a, 117b and 117c, respectively, which place the conduits 116a–116c in fluid flow communication with either conduits 118a, 118b, and 118c, respectively, or conduits 119a, 119b and 119c, respectively. The conduits 118a–118c are in fluid flow communication with a source of positive gas pressure 121 through conduit 122, and conduits 119a–119c are in fluid flow communication with the atmosphere through conduit 123.

The metering vessel 112, as illustrated, is positioned at an elevation greater than the elevation of storage vessels 111a–111c and is provided with a conduit 124, connecting to a three-way valve 125 to place the conduit 124 in fluid flow communication with either a source of positive gas pressure through conduits 126 and 127 or the atmosphere through conduits 128 and 129. The metering vessel 112 is further provided with a sidearm 131, and an outlet portion 132 with outflow from the metering vessel controlled by a solenoid valve 133. A pair of photocells 134 and 135 of a type known in the art, are positioned at different levels on a sidearm 131 and function to sense the level of fluid in metering vessel 112, as hereinafter described.

The outlet portion 132 of the metering vessel 112 is placed in fluid flow communication with the inlet 136 of the reaction vessel 113 by conduit 137, which is provided with a photocell 140. The reaction vessel 113 is provided with: a conduit 138, connecting to a three-way valve 139, which places the reaction vessel 113 in fluid flow communication with either a source of positive gas pressure through conduits 141 and 127 or the atmosphere through conduits 142 and 129; and outlet portion 143; and a shaking mechanism (schematically indicated as 144) to provide mixing of the reactant(s) or reagent(s) in the reaction vessel 113. The reaction vessel 113 contains (at the lower portion thereof) a sintered disk 145 which functions as both a filter and a support for a solid reactant.

The outlet 143 of reaction vessel 113 is connected to the waste flask 114 through conduit 146 (containing a solenoid valve 147 or siphon) and is further provided with a photocell 148 which senses fluid flow therethrough, as hereinafter described. It should be apparent that the conduits 137, 138 and 146 must be formed of a flexible material, so that shaking of the reaction vessel 113 may be effected. The waste flask 114 is provided with an outlet conduit 149 (containing a three-way valve 141) which places conduit 149 in fluid flow communication with either an exhaust conduit 152 or a vacuum source (not shown) through conduit 153.

The reaction system 110 is provided with a control unit 154, containing a program tape reader 155, to automatically control the reaction system. At the beginning of a cycle all three-way valves are open to the atmosphere and the solenoid valves 133 and 147 are closed. The control unit 154 initiates the cycle by operating three-way valve 117a to place vessel 111a in fluid flow communication with the source of positive gas pressure 121 through conduits 116a, 118a and 122. The increased pressure in vessel 111a causes fluid to flow therefrom through conduit 115a into metering vessel 112. The fluid rises in the metering vessel 112 and the sidearm 131 thereof, and when the level of liquid reaches either photocell 134, or photocell 135, the beam emanating therefrom is interrupted, signaling the control unit 154 to operate three-way valve 117a to place storage vessel 111a in communication with the atmosphere through conduits 116a, 119a and 123. The position and choice of the photocell 134 or 135 on sidearm 131 is dependent upon the level of liquid desired. The placing of the storage vessel 111a in communication with the atmosphere immediately stops the flow of fluid from conduit 115a into metering flask 112 due to the lower pressure head in the storage vessel 111a caused by the differences in height between the storage vessel 111a and metering vessel 112. Thus, the flow to the metering vessel 113 is immediately stopped by a siphon effect and all of the fluid in line 115a returns to storage vessel 111a.

The photocell 134 or 135, upon the liquid reaching the level thereof, also signals the tape reader 155 by means of the control unit 154 to initiate the next step of the cycle involving transferring of the fluid from the metering vessel 112 to the reaction vessel 113. The control unit 154 operates the three-way valve 125 to place the metering vessel 112 in fluid flow communication with a source of positive gas pressure through conduits 124, 126 and 127, and opens the solenoid valve 133 to place the metering vessel 112 in fluid flow communication with the reactor 113.

The fluid to flow from the metering vessel 112 flows essentially by gravity into the reaction vessel 113 past the photocell 140 causing an interruption in the beam emanating therefrom. As soon as all of the fluid flows from metering vessel 112 to the reactor 113, or at a predetermined interval after such time, the photocell 140 signals the tape reader 155 by means of the control unit 154 to initiate the next step of the cycle, involving mixing of the fluid in the reaction vessel 113 with fluid or solid reagent(s) or reactant(s) previously introduced to vessel 113.

The control unit 154 simultaneously closes solenoid valve 133, actuates three-way valve 125 to place the metering vessel 112 in fluid flow communication with the atmosphere through conduits 124, 128 and 129, and actuates the shaker mechanism 144 which oscillates the reactor 113 to effect mixing of reactants. The control unit 154 operates to maintain the shaking for a predetermined period of time or number of strokes and after such time, or number of strokes, the control unit 154 signals the tape reader 155 to initiate the next step of the cycle, involving removal of waste material from the reaction vessel 113.

The control unit simultaneously: opens solenoid valve 147; actuates three-day valve 139 to place the reaction vessel 113 in fluid flow communication with positive gas pressure through conduits 138, 141 and 127; and actuates three-way valve 151 to place the waste vessel 114 in fluid flow communication with a vacuum through conduits 149 and 153. The waste material in the reaction vessel 113 is filtered through the disk 145 into the waste vessel 114 under the influence of the positive gas pressure in reaction vessel 113 and the vacuum in waste vessel 114. The waste fluid flows past the photocell 148 which, similarly to the operation of photocell 140, interrupts the beam emanating therefrom. As soon as the fluid ceases to flow from the reaction vessel 113 to the waste vessel 114 the photocell 148 signals the control unit 154 which thereafter (or after a predetermined time delay) initiates the next step of the cycle. The control unit 154 then: closes solenoid valve 147; actuates three-way valve 139 to place the reaction vessel 113 in fluid flow communication with the atmosphere through conduits 138, 142 and 129; and actuates three-way valve 117b to place storage vessel 111b in fluid flow communication with the source of positive gas pressure 121 through conduit 116b, 118b, and 122, thereby initiating the next cycle.

Thus, a complete cycle has been described and is repeated in a similar manner until each of the required reactants or reagents is transferred from the storage vessel to the metering vessel and then to the reaction vessel.

The more detailed system of FIG. 2, herein above described, may be modified by interrupting flow from the storage vessels to the metering vessel by other than a siphon technique. Thus, for example, the storage vessels and metering vessel may be placed on the same level, or on different levels, and the flow interrupted by placing the storage vessel in fluid flow communication with a negative pressure (vacuum) instead of the atmosphere. Thus, in this manner, the pressure head in the storage vessel would be below the pressure head prevailing in the metering vessel, thereby instantly interrupting the flow therebetween.

The system may be further modified by eliminating one or both of the solenoid valves 133 and 147 and providing for transfer between the metering vessel 112 and reaction vessel 113 and/or between the reaction vessel 113 and the waste vessel 114 by means of a siphon in conjunction with a flow sensing device. Furthermore, the volume of reactant transferred may be regulated by providing a multiplicity of metering vessels each having a desired volume or by repeated filling of a single metering vessel.

As another modification, the metering vessel may be eliminated and reagents transferred directly from the storage vessel to the reaction vessel, with the flow being interrupted as hereinabove described. The metering of reagents could be effected by a time correlation or by any other manner which is within the scope of those skilled in the art.

As yet a further modification, the vacuum on waste vessel 114 could be eliminated and the waste material filtered through the disk by the positive gas pressure applied to reaction vessel 113. It should also be apparent that numerous modifications could be made in the automatic control of the reaction system, for example, by using level and flow sensing means other than photocells.

The above specifically mentioned modifications and a wide variety of other modifications are deemed to be within the scope of those skilled in the art from the teachings contained herein.

The reaction system hereinabove described is particularly applicable to the solid-phase synthesis of peptides. Thus, the protected form of the first amino acid in the desired peptide chain, linked to a solid support, is placed on the disk in the reaction vessel 113. The storage vessels 111 are filled with the appropriate amino acids, solvents, condensing agents, etc., and the control unit 154 and tape reader 155 programmed to pass the reactants and reagents from the storage vessels to the metering vessel and reaction vessel, as hereinabove described, in the proper sequence. The various reactants and reagents are transferred from the storage vessels to the metering vessel, without contacting any pumps or valves and, therefore, the corrosion and contamination problems encountered in previous reaction systems are essentially eliminated. In addition, there is no donger of a pump failing since all transfer is effected without the aid of a pump. It should be readily apparent that the reaction system would be fabricated from materials which are appropriate to the reactants and reagents employed, for example, polytetrafluoro-ethylene (or analogs) tubing for the various conduits, a glass reaction vessel, etc. The gas pressure for transferring reagents would be supplied by nitrogen gas, preferably at a pressure of about 1.25 atmospheres for transferring reagents from the storage vessels and about 1.05 atmospheres for flushing the metering and reaction vessels. The entire system would be flushed with nitrogen prior to initiating the reaction cycle thereby providing an added advantage of conducting the entire reaction in an inert atmosphere.

The hereinabove described reaction systems offers numerous advantages over those heretofore employed in the art, with the principal advantage being the transfer of a plurality of different reagents to a vessel without the reagents contacting a pump or valve. It should be apparent that although the reaction system is particularly suited to the solid-phase synthesis of peptides, the system is not limited to such an application and may be effectively utilized in a wide variety of processes.

Many modifications and variations of the present invention are possible in light of the above teachings and therefore, it is to be understood that within the scope of the appended claims, the invention may be practiced otherwise than as specifically described.

What is claimed is:
1. A reaction system comprising:
   (a) a first vessel adapted to hold a fluid;
   (b) a second vessel;
   (c) a first conduit means free of valves therein for controlling flow therethrough placing the first vessel in fluid flow communication with the second vessel, said first conduit means being positioned with respect to the first and second vessels whereby fluid can be transferred through the first conduit means from the first vessel to the second vessel and fluid cannot be transferred through the first conduit means from the second vessel to the first vessel; and
   (d) control means for selectively connecting the first vessel to a first pressure head of greater pressure than the pressure head prevailing in the second vessel and to a second pressure head of lesser pressure than the pressure head prevailing in the second vessel, whereby fluid flows from the first vessel to the second vessel when applying the first pressure head and immediately upon applying the second pressure head fluid stops flowing from the first to the second vessel, fluid in said first conduit means returns to the first vessel, and fluid in said second vessel does not flow from the second vessel to the first through the first conduit means.

2. The reaction system of claim 1 and further comprising a source of gas pressure at a pressure greater than atmospheric pressure and wherein the second vessel is at atmospheric pressure and positioned at a height greater than the height of first vessel, the control means connecting the first vessel to the source of gas pressure to apply the first pressure head and to the atmosphere to apply the second pressure head.

3. The reaction system of claim 1 and further comprising, a source of gas at a pressure greater than the pressure prevailing in the second vessel, a vacuum source at a lesser pressure than the pressure prevailing in the second vessel, said control means connecting the first vessel to the gas source to apply the first pressure head and to the vacuum source to apply the second pressure head.

4. A reaction system comprising:
   (a) a plurality of storage vessels adapted to hold reagents;
   (b) a metering vessel;
   (c) a reaction vessel;
   (d) a plurality of first conduit means free of valves therein for controlling flow therethrough placing the storage vessels in fluid flow communication with the metering vessel, one of said first conduit means placing one of said storage vessels in fluid flow communication with the metering vessel, each of said first conduit means being positioned with respect to its corresponding storage vessel and the metering vessel whereby fluid can be transferred through each of the first conduit means from the storage vessel to the metering vessel and fluid can not be transferred through each of the first conduit means from the metering vessel to the storage vessel;
   (e) second conduit means placing the metering vessel in fluid flow communication with the reaction vessel;
   (f) first control means for controlling the flow of reagents between the metering vessel and the reaction vessel; and
   (g) second control means for controlling the flow of reagents between each of said storage vessels and the metering vessel, said second control means selectively applying a first pressure head to reagents in each of the storage vessels of greater pressure than the pressure head prevailing in the metering vessel and a second pressure head to fluid in each of the storage vessels of lesser pressure than the pressure head prevailing in the metering vessel, whereby reagent flows from a storage vessel to the metering vessel when applying the first pressure head and when applying the second pressure head fluid stops flowing from the storage vessel to the reaction vessel, fluid in said first conduit means returns to the storage vessel and fluid in said metering vessel does not flow from said metering vessel to said storage vessel through the first conduit means.

5. The reaction system of claim 4 and further comprising a source of gas at a pressure greater than atmospheric pressure and wherein the metering vessel is at about atmospheric pressure and positioned above the storage vessels, said second control means connecting one of said storage vessels to the source of gas to apply the first pressure head and to the atmosphere to apply the second pressure head.

6. The reaction system of claim 4 and further comprising: a source of gas at a pressure greater than the pressure prevailing in the metering vessel; and a vacuum source, said vacuum source being at a lesser pressure than the pressure prevailing in the metering vessel, said second control means connecting one of said storage vessels to the source of gas to apply the first pressure head and to the vacuum source to apply the second pressure head.

7. The reaction system of claim 4 wherein the second control means comprises: a three-way valve for each storage vessel; third conduit means placing each storage vessel in fluid flow communication with the valve therefor; fourth conduit means connecting each valve to a first pressure source to apply the first pressure head; and fifth conduit means connecting each valve to a second pressure source to apply the second pressure head.

8. The reaction ssytem of claim 7 wherein the first control means comprises a valve in the second conduit means.

9. The reaction system of claim 7 and further comprising: a third control means for selectively placing the metering vessel in fluid flow communication with a source of gas at a pressure greater than atmospheric pressure and with the atmosphere; and a fourth control means for selectively placing the reaction vessel in fluid flow communication with a source of gas at a pressure greater than atmospheric pressure and with the atmosphere.

10. The reaction system of claim 4 wherein said first control means selectively applies a pressure head to material in the metering vessel of greater pressure than the pressure head prevailing in the reaction vessel whereby reagent flows from the metering vessel to the reaction vessel, and a pressure head to material in the metering vessel of lesser pressure than the pressure head prevailing in the reaction vessel, to prevent reagent from flowing from the metering vessel to the reaction vessel.

11. A reaction system comprising:
   (a) a first vessel;
   (b) a second vessel;
   (c) a third vessel;

(d) a first conduit means free of valves therein for controlling flow therethrough placing the first vessel in fluid flow communication with the second vessel, said first conduit means being positioned with respect to the first and second vessels whereby fluid can be transferred through the first conduit means from the first vessel to the second vessel and fluid can not be transferred through the first conduit means from the second vessel to the first vessel;

(e) a second conduit means placing the second vessel in fluid flow communication with the third vessel;

(f) a third conduit means connected to said first vessel, said third conduit means containing a first valve means for selectively placing the third conduit in fluid flow communication with a pressure source to apply a pressure head to material in the first vessel greater than the pressure head in the second vessel and to a second pressure source to apply a second pressure head to material in the first vessel less than the pressure head in the second vessel;

(g) a fourth conduit means connected to said second vessel, said fourth conduit means containing a second valve means for selectively placing the fourth conduit in fluid flow communication with a pressure source to apply a third pressure head to material in the second vessel greater than the pressure head in the third vessel and to a pressure source to apply a fourth pressure head to material in the second vessel less than the pressure head in the third vessel; and (h) a control means operatively connected to the first and second valve means, said control means operating the first valve means to apply the first pressure head to material in the first vessel to transfer material from the first vessel to the second vessel and to apply the second pressure head to interrupt the flow from the first vessel to the second vessel, and said control means operating the second valve means to apply the third pressure head to material in the second vessel to transfer material from the second vessel to the third vessel and to apply the fourth pressure head to interrupt the flow from the second vessel to the third vessel.

12. In the production of peptides by a solid-phase synthesis technique wherein a plurality of reagents, including amino acids, and solvents, each in a separate storage zone, are sequentially passed from their respective storage zones to a second zone in a predetermined sequence, an improved process comprising:

(a) passing the reagent from one of said storage zones to said second zone by applying a positive gas pressure to the reagent in said one storage zone, said gas pressure being above the prevailing pressure in the second zone whereby the reagent flows from said one storage zone to the second zone;

(b) interrupting the flow of reagent to the second zone from said one storage zone by stopping the application of the positive gas pressure to the reagent in said one storage zone while simultaneously applying a pressure head to the reagent in said one storage zone of lower pressure than the pressure head prevailing in the second zone while retaining the reagent in the second zone, said passage of reagent from a storage zone to a second zone and interruption of flow being accomplished solely by the aforesaid application of gas pressure and pressure head; and (c) repeating steps (a) and (b) to transfer reagent from the remaining storage zones to the second zone in accordance with said predetermined sequence.

13. The process defined by claim 12 wherein the second zone is a metering zone, said flow being interrupted after a predetermined amount of reagent has been transferred to said second zone and further comprising transferring the reagent from the second zone to a reaction zone prior to step (c) in each portion of the predetermined sequence.

14. The process as defined by claim 13 wherein the reagent is transferred from the metering zone to the reaction zone by the application of positive gas pressure.

15. A reaction system comprising:

(a) a plurality of storage vessels adapted to hold reagents;

(b) a metering vessel;

(c) a reaction vessel;

(d) a plurality of first conduit means free of valves therein for controlling flow therethrough placing the storage vessels in fluid flow communication with the metering vessel, one of said first conduit means placing one of said storage vessels in fluid flow communication with the metering vessel; each of said first conduit means being positioned with respect to its corresponding storage vessel and the metering vessel whereby fluid can be transferred through each of the first conduit means from the storage vessel to the metering vessel and fluid can not be transferred through each of the first conduit means from the metering vessel to the storage vessel;

(e) second conduit means placing the metering vessel in fluid flow communication with the reaction vessel;

(f) first control means for controlling the flow of reagents between the metering vessel and the reaction vessel;

(g) second control means for controlling the flow of reagents between each of said storage vessels and the metering vessel, said second control means selectively applying a first pressure head to reagents in each of the storage vessels of greater pressure than the pressure head prevailing in the metering vessel and a second pressure head to fluid in each of the storage vessels of lesser pressure than the pressure head prevailing in the metering vessel, whereby reagent flows from a storage vessel to the metering vessel when applying the first pressure head and when applying the second pressure head fluid stops flowing from the storage vessel to the metering vessel, fluid in said first conduit means returns to the storage vessel and fluid in said metering vessel does not flow from said metering vessel to said storage vessel through the first conduit means;

(h) a waste vessel;

(i) third conduit means placing the reaction vessel in fluid flow communication with the waste vessel;

(j) third control means for controlling the flow of reagents between the reaction vessel and the waste vessel;

(k) a first sensing means to provide a first signal responsive to a predetermined amount of reagent in said metering vessel;

(l) a second sensing means to provide a second signal responsive to completion of transfer of reagent from the metering vessel to the reaction vessel;

(m) mixing means for mixing reagent in said reaction vessel;

(n) a third sensing means to provide a third signal responsive to completion of transfer of reagent from the reaction vessel to the waste vessel;

(o) an automatic control means operatively connected to said first, second and third control means, said mixing means and said first, second and third sensing means for receiving said first, second and third signals, said automatic control means operating said second control means to pass reagent from a first storage vessel to the metering vessel until receipt of the first signal from the first sensing means, said automatic control means in response to said first signal operating the second control means to stop flow from the first storage vessel to the metering vessel and operating the first control means for passing reagent from the metering vessel to the reaction vessel until receipt of the second signal from the second sensing means, said automatic control means in response to said second signal operating the mixing means to mix reagent in the reaction vessel for a predetermined period of time, thereafter said automatic control means operating the third control means to pass material from the reaction vessel to the waste vessel until receipt of the third signal from the third sensing means, said automatic control means in response to said third signal operating the second control means to pass reagent from a second storage vessel to the metering vessel.

References Cited

UNITED STATES PATENTS

| | | | |
|---|---|---|---|
| 1,973,755 | 9/1934 | Geyer | 23—253X |
| 3,098,819 | 7/1963 | Sager | 23—253X |
| 3,348,921 | 10/1967 | Katz et al. | 23—359 |

MORRIS O. WOLK, Primary Examiner

R. E. SERWIN, Assistant Examiner

U.S. Cl. X.R.

23—253, 259; 137—7, 12, 36